United States Patent [19]
Sai et al.

[11] Patent Number: 5,449,233
[45] Date of Patent: Sep. 12, 1995

[54] TEMPERATURE DISTRIBUTION MEASURING APPARATUS USING AN OPTICAL FIBER

[75] Inventors: Yukio Sai, Tokorozawa; Hiroyuki Kaneko; Yuji Miyane, both of Tokyo, all of Japan

[73] Assignee: Kabushiki Kaisha Toshiba, Japan

[21] Appl. No.: 78,751

[22] Filed: Jun. 16, 1993

[30] Foreign Application Priority Data

Jun. 16, 1992 [JP] Japan ................. 4-156772
Jul. 22, 1992 [JP] Japan ................. 4-195161

[51] Int. Cl.$^6$ .............................................. G01K 11/32
[52] U.S. Cl. ....................... 374/161; 374/137; 356/44; 356/301; 250/227.14
[58] Field of Search ............ 374/161, 137, 131; 356/44, 301; 250/227.14

[56] References Cited

U.S. PATENT DOCUMENTS

| | | | |
|---|---|---|---|
| 4,767,219 | 8/1988 | Bibby | 374/131 |
| 4,823,166 | 4/1989 | Hartog et al. | 356/301 |
| 5,028,146 | 7/1991 | Wada | 374/131 |
| 5,054,935 | 10/1991 | Tanabe et al. | 374/161 |
| 5,217,306 | 6/1993 | Wada | 374/161 |

FOREIGN PATENT DOCUMENTS

| | | | |
|---|---|---|---|
| 0217731 | 9/1986 | Japan | 374/161 |
| 0061622 | 3/1989 | Japan | 374/161 |
| 2-145932 | 6/1990 | Japan | |
| 2140554 | 11/1984 | United Kingdom | 374/137 |

*Primary Examiner*—Diego F. F. Gutierrez
*Attorney, Agent, or Firm*—Limbach & Limbach; Alan S. Hodes

[57] ABSTRACT

A temperature distribution measuring apparatus, which inputs pulsed-light into an optical fiber, measures backward Raman-scattered light generated in the optical fiber, and calculates a temperature distribution along the optical fiber in accordance with the ratio of the intensity of anti-Stokes' light to the intensity of Stokes' light of the backward Raman-scattered light. The apparatus comprises an optical filter for extracting the anti-Stokes' light and Stokes' light from the backward Raman-scattered light, an optical attenuator for attenuating the Stokes' light extracted by the optical filter, an optical switch for receiving the anti-Stokes' light extracted by the optical filter and the Stokes' light output from the optical attenuator, and selectively outputting one of the anti-Stokes' flight and Stokes' light, a light-receiving element for detecting the intensity of the light output from the optical switch, an amplifier for amplifying an analog electrical signal produced by the light-receiving element, an amplified analog-to-digital converter for converting the analog electrical signal into a digital signal, and a signal processor for measuring the temperature distribution along the optical fiber by processing the digital signal.

6 Claims, 9 Drawing Sheets

TEMPERATURE DISTRIBUTION MEASURING APPARATUS USING AN OPTICAL FIBER

BACKGROUND OF THE INVENTION

1. Field of the Invention

The present invention relates to a temperature distribution measuring apparatus for obtaining a temperature distribution along an optical fiber by inputting pulsed-light into the optical fiber and measuring backward Raman-scattered light in the optical fiber caused by the pulsed-light and, more particularly, to a temperature distribution measuring apparatus for obtaining improved measurement precision by removing periodic noise caused by clocks of a digital system in the measurement apparatus.

2. Description of the Related Art

In the field of optical application sensing, an Optical Time Domain Reflectometry (OTDR) type temperature distribution measuring apparatus is known. Such a measuring apparatus obtains a temperature distribution along an optical fiber by inputting pulsed-light from one end of the optical fiber, and sampling and measuring backward Raman-scattered light-scattered at respective points in the optical fiber.

Figure 1:
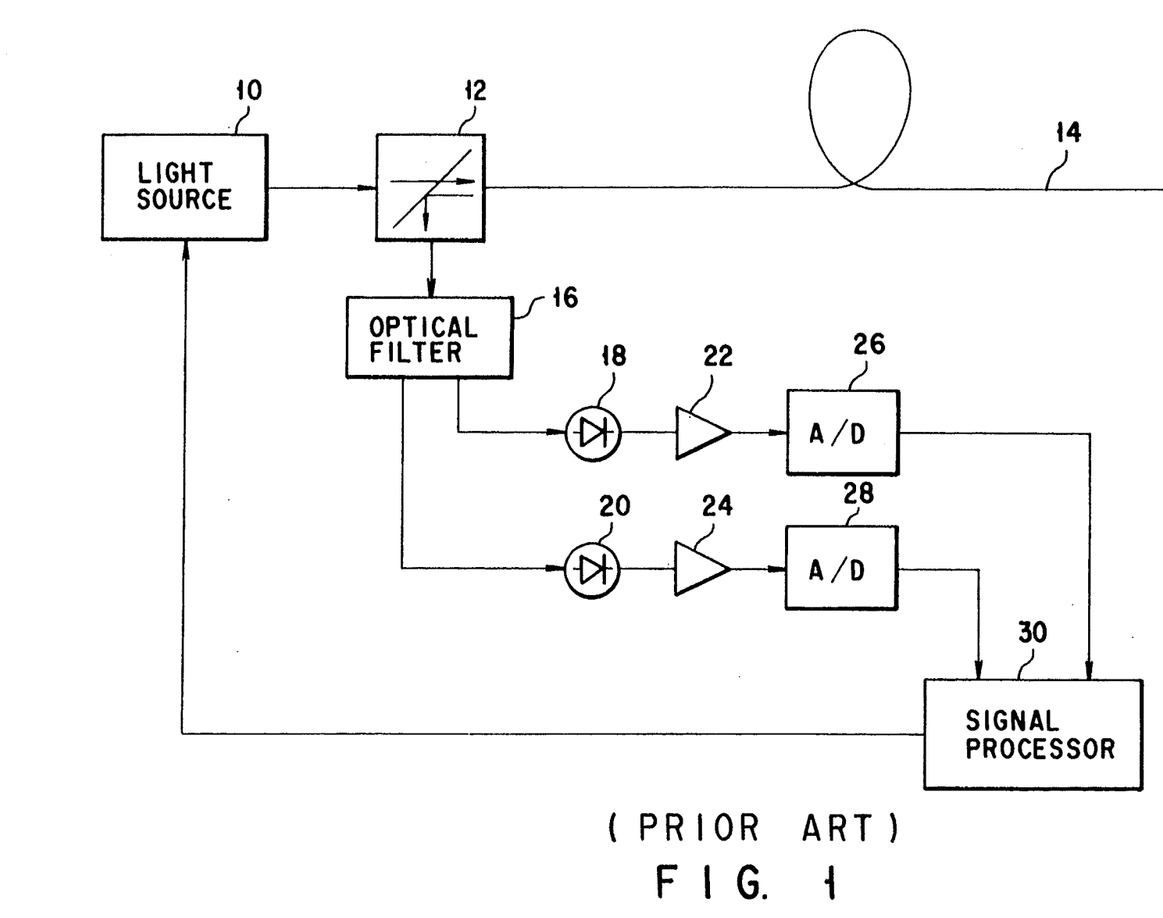
FIG. 1 is a block diagram showing a conventional temperature distribution measuring apparatus using an optical fiber.

FIG. 1 is a block diagram showing the overall arrangement of a conventional OTDR temperature distribution measuring apparatus. A light source 10 for emitting pulsed-light is connected to an optical fiber probe 14 for temperature measurement via a directional coupler 12. The probe 14 is a graded-index (GI) type optical fiber. The probe 14 is set in a place where the temperature is to be measured. In FIG. 1, the probe 14 is looped. However, the probe 14 need only be arranged along an object to be measured, and need not always be looped.

Pulsed-light emitted from the light source 10 is input to the probe 14 via the directional coupler 12, is Raman-scattered in the probe 14, and returns as backward scattered light. The backward scattered light is input to an optical filter 16 through the directional coupler 12. The optical filter 16 includes two filters for respectively extracting anti-Stokes' light and Stokes' light from the incident backward Raman-scattered light. The anti-Stokes' light and Stokes' light have different wavelengths, and can be extracted by inserting filters for the corresponding wavelengths.

The anti-Stokes' light and Stokes' light are respectively input to light-receiving elements 18 and 20, and are converted into electrical signals representative of the intensities of the anti-Stokes' light and the Stokes' light. These electrical signals are amplified by amplifiers 22 and 24. The analog electrical signals output from the amplifiers 22 and 24 are sampled by A/D converters 26 and 28 at high speed. Each of the A/D converters 26 and 28 is normally constituted by a plurality of A/D conversion circuits since it must execute high-speed sampling. The high-speed sampling can be realized by sequentially driving the plurality of A/D conversion circuits by shifting their sampling periods by a time obtained by dividing each sampling period by the number of A/D conversion circuits. Digital signals obtained by the A/D converters 26 and 28 are supplied to a signal processor 30, and the signal processor 30 calculates a temperature distribution on the basis of the ratio between the two digital signals. Note that the signal processor 30 supplies a driving signal for controlling the light emission timing to the light source 10.

Of backward Raman-scattered light, the intensity of the anti-Stokes' light changes depending on the temperature, while a temperature-dependent change in intensity of the Stokes' light is not as large. More specifically, theoretically speaking, the temperature is expressed as a function of the ratio of the intensity of the anti-Stokes' light to the intensity of the Stokes' light. The time from when pulsed-light is generated until backward scattered light is observed is proportional to the distance between the light source 10 and the scattered position of the pulsed-light if the light velocity in the optical fiber 14 is assumed to be constant. Therefore, when the ratio the intensity of anti-Stokes' light to the intensity of the Stokes' light is plotted along the time axis, the temperature distribution along the probe 14 can be measured.

When temperature measurement is performed based on the above-mentioned method, the obtained signal is very small, and includes many noise components. Thus, by utilizing the fact that the signal includes many random noise components, several ten thousands to several millions of measurements are performed, and the measurement results are averaged by the signal processor 30, thereby removing the effect of random noise components.

However, although this method can remove random noise components having no time correlations, it is very difficult for this method to remove noise components having time correlations, in particular, noise components synchronous which are with pulsed-light such as clocks of digital circuits.

Noise caused by clocks of digital circuits are discussed below. More specifically, the above-mentioned temperature distribution measuring apparatus must execute high-speed signal sampling. For example, in order to perform measurement with a distance resolution of 1 meter, sampling must be performed at 100 MHz. An A/D converter used for such a purpose is called a flash type A/D converter, normally has precision as low as about 8 bits, and has no integral function, as a matter of course. However, the above-mentioned temperature distribution measuring apparatus requires precision as high as 1 bit or less.

Thus, by utilizing the fact that a signal originally includes many random noise components, required resolution is realized by executing several ten thousands to several millions of numerical value averaging processing operations. Such a signal processing method is called a dither method, and can obtain resolution as high as that obtained using a 10- or 12-bit A/D converter even when, e.g., an 8-bit A/D conversion is used.

However, since clock noise of digital circuits is synchronous with sampling, it cannot be removed by the above-mentioned averaging process. The clock noise is mainly generated during the operations of the A/D converters 26 and 28, and is often generated in the light-receiving elements 18 and 20 or the amplifiers 22 and 24 as well. In this case, although clock noise can be slightly decreased by reinforcing a power supply or by grounding, it is difficult to remove all the clock noise.

In the conventional temperature distribution measuring apparatus, anti-Stokes' light and Stokes' light are measured by different electronic circuits. Since synchronous noise patterns caused by clocks vary depending on individual circuits, it is almost impossible, in consideration of characteristic variations of circuit elements, to prepare a plurality of circuits having completely the same synchronous noise patterns.

For this reason, when the ratio of the intensity of Stokes' light to that of anti-Stokes' light is converted into the temperature, periodic noise caused by a difference in synchronous noise patterns in Stokes' light and anti-Stokes' light owing to clocks still remains, and this limits the measurement resolution. The same applies to all periodic noise components owing to factors except for clocks.

Published Unexamined Japanese Patent Application No. 2-145932 describes an apparatus which removes periodic noise. This apparatus obtains a measurement by subtracting a measured value obtained when no pulsed-light is input to an optical fiber from a measured value obtained when pulsed-light is input, thereby detecting periodic noise generated in a measurement system. However, two measurements are required, and the measurement time is doubled. In addition, it is not ensured that the same noise components are generated in the two measurements, and periodic noise cannot be precisely detected. When pulsed-light is emitted, since a large current is supplied to a light source, the noise may include switching noise.

As described above, the conventional temperature distribution measuring apparatus has undesirably low detection precision since the obtained signal includes periodic noise components synchronous with measurement, e.g., synchronous with clocks.

SUMMARY OF THE INVENTION

Accordingly, it is an object of the present invention to provide a high-precision temperature distribution measuring apparatus, which can remarkably improve the temperature resolution by removing noise components synchronous with the measurement period such as sampling clocks.

In accordance with the present invention, an improved apparatus for measuring a temperature distribution along an optical fiber is provided. The apparatus comprises a light source means for inputting pulsed-light into the optical fiber. Optical filter means receive backward Raman-scattered light of the pulsed-light generated in the optical fiber, and extracting anti-Stokes' light and Stokes' light from the backward Raman-scattered light. Attenuation means attenuate the intensity of the Stokes' light extracted by the optical filter means, preferably to be nearly equal to the intensity of the anti-Stokes' light. Optical switching means receive the anti-Stokes' light extracted by the optical filter means and the intensity-attenuated Stokes' light output from the attenuation means and selectively output one of the anti-Stokes' light extracted and the intensity-attenuated Stokes' light output. Light-receiving means detect the light output from the optical switching means to output an analog signal representative of the intensity of the light output from the optical switching means. Analog-to-digital conversion means convert the analog signal output from the light-receiving means into a digital signal. Finally, calculation means calculate a temperature distribution along the optical fiber on the basis of the digital signal.

In accordance with an alternate embodiment of the present invention, the attenuation means is located between the optical switching means and the light-receiving means.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which.

DETAILED DESCRIPTION OF THE PREFERRED EMBODIMENTS

Figure 2:
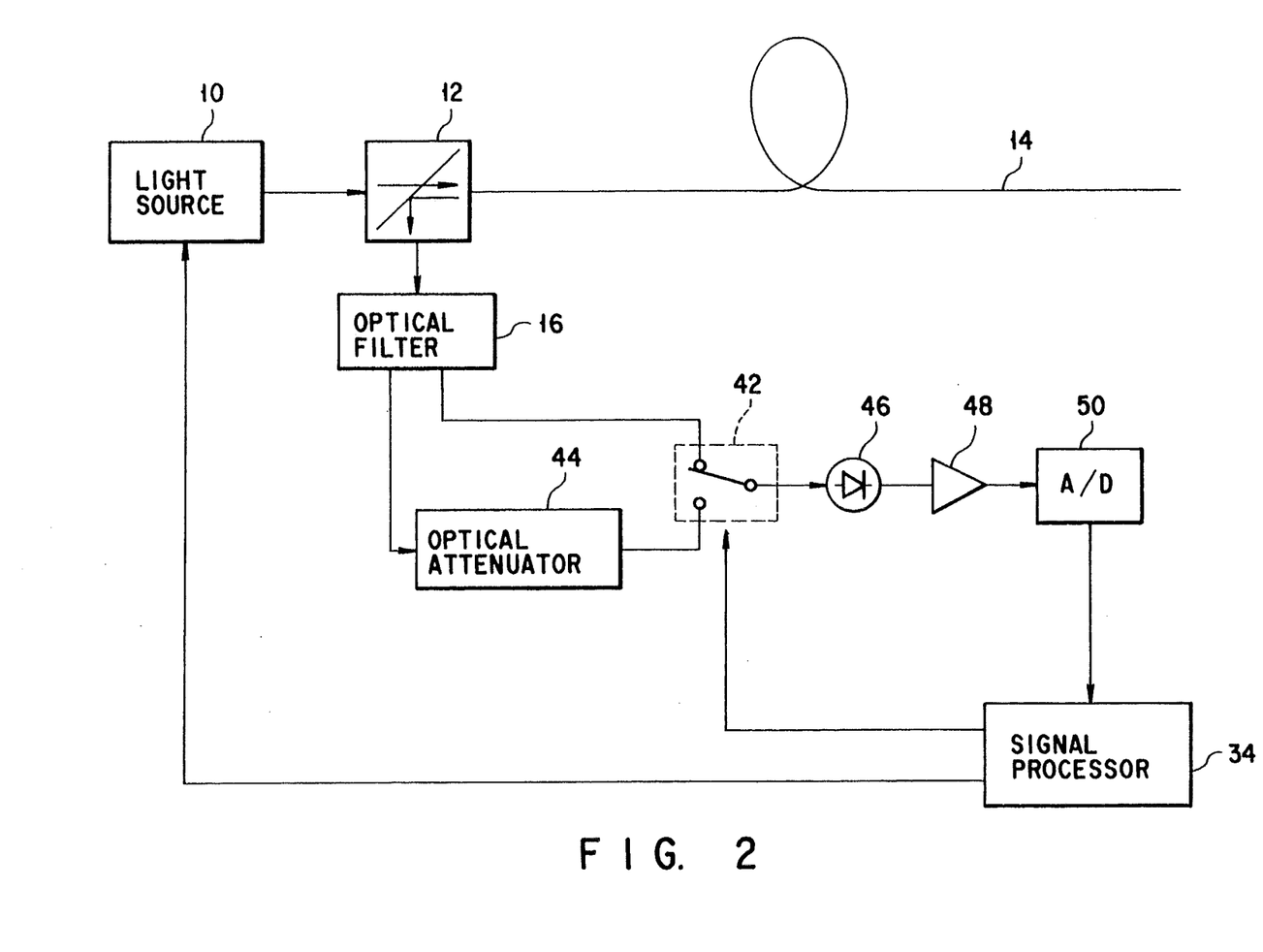
FIG. 2 is a block diagram showing a temperature distribution measuring apparatus according to the first embodiment of the present invention.

The preferred embodiments of a temperature distribution measuring apparatus according to the present invention will be described hereinafter with reference to the accompanying drawings. FIG. 2 is a block diagram showing the overall arrangement of a temperature distribution measuring apparatus according to the first embodiment of the present invention. The same reference numerals in FIG. 2 denote the same parts as in the prior art shown in FIG. 1, and a detailed description thereof will be omitted.

In this embodiment, a two-input/one-output optical switch 42 is additionally provided. The optical switch 42 serves as an optical signal switching means for switching an optical path so that anti-Stokes' light and Stokes' light extracted by an optical filter 16 are A/D-converted by a single A/D converter 50. The optical switch 42 is controlled by a signal processor 34. Anti-Stokes' light extracted from the optical filter 16 is directly supplied to the first input terminal of the optical switch 42, and Stokes' light is supplied to the second input terminal of the optical switch 42 via an optical attenuator 44. Output light from the optical switch 42 is converted into an electrical signal by a light-receiving element 46, the magnitude of the electrical signal representing the intensity of the output light from the optical switch 42. The output signal from the light-receiving element 46 is supplied to the signal processor 34 via an amplifier 48 and the A/D converter 50. Note that the optical filter 16 allows light components having two different wavelengths corresponding to anti-Stokes' light and Stokes' light to simultaneously pass therethrough. However, filters exclusively used for anti-Stokes' light and Stokes' light may be alternately used.

The operation of the temperature distribution measuring apparatus of the first embodiment will be described below.

Pulsed-light is emitted from the light source 10, and is input to the probe 14 via the directional coupler 12. Backward Raman-scattered light returned from the probe 14 is transmitted through the directional coupler 12 again, and is then input to the optical filter 16. Stokes' light extracted by the optical filter 16 is attenuated by the optical attenuator 44 so that its signal level becomes almost but not quite equal to that of anti-Stokes' light, and the attenuated light is input to the optical switch 42. The optical switch 42 supplies one of the anti-Stokes' light and Stokes' light to the light-receiving element 46. The output signal from the light-receiving element 46 is sampled by the A/D converter 50, and the output signal from the A/D converter 50 is subjected to averaging processing in the signal processor 34 so as to remove random noise. Upon completion of sampling and averaging processing of one light, the optical switch 42 is switched to output the other light, and sampling and averaging processing of the other light is similarly performed. In this manner, both the anti-Stokes' light and Stokes' light are sampled by the same light-receiving element 46, amplifier 48, and A/D converter 50. The signal processor 34 finally calculates the ratio of the average intensity anti-Stokes' light to that of Stokes' light.

If the true intensities (average values) of the anti-Stokes' light and Stokes' light are respectively represented by Ia and Is, the temperature is expressed as a function of the ratio Ia/is of the two intensities. However, actually measured signals include synchronous noise components. Ignoring random noise removed by the averaging processing, if the synchronous noise components added to the anti-Stokes' light and Stokes' light are respectively represented by Na and Ns, the measured signals are respectively Ia+Na and Is+Ns. For this reason, the ratio of the intensity of anti-Stokes' light to the intensity of Stokes' light is given by (Ia+Na)/(Is+Ns).

In the conventional temperature distribution measuring apparatus, since synchronous noise components Na and Ns respectively added to the anti-Stokes' light and Stokes' light are different from each other, a considerable error is generated in the true value Ia/Is.

However, in the temperature distribution measuring apparatus of this embodiment, the anti-Stokes' light and Stokes' light are sampled by the same light-receiving element 46, amplifier 48, and A/D converter 50. Since the synchronous noise sources are mainly three sources described above, the synchronous noise components Na and Ns can be considered to be equal. Thus, assuming $Na=Ns=N$, and $|N/Is|<1$ (i.e. normal synchronous noise is smaller than a signal), the ratio of anti-Stokes' light to Stokes' light can be represented as follows using series-development expression:

$$(Ia + N)/(Is + N) = \\ (Ia/Is) - \{(Ia - Is)/Is\} \times (N/Is) + \{(Ia - Is)/Is\} \times (N^2/Is^2) \quad (1)$$

In equation (1), the first term of the right-hand side represents the true intensity ratio, and the second and subsequent terms represent errors due to synchronous noise. The second and subsequent terms are proportional to the intensity difference (In−Is) of the two light components. Therefore, as can be understood from the above description, if Ia and Is have nearly the same values, the influence of the synchronous noise N becomes very small.

The Stokes' light immediately after it has passed the optical filter 16 has an intensity several to ten times that of the anti-Stokes' light. Therefore, the intensity of the Stokes' light input to the light-receiving element 46 is adjusted by the optical attenuator 44 so that Ia and Is have nearly the same values, thereby removing most of the synchronous noise N.

In this case, the optical attenuator 44 may have a fixed attenuation factor. However, when the measurement temperature range is wide or a distribution across a long distance is to be measured, it is often difficult to minimize the difference between Ia and Is over the entire measurement area. In such a case, the optical attenuator 44 may be controlled to have a variable attenuation factor. More specifically, the optical attenuator 44 is preferably controlled at a point requiring the highest precision in the entire measurement area so that Ia and Is become nearly equal to each other, thereby minimizing an error at that point. Furthermore, the measurement area may be divided into a plurality of areas, and attenuation factors may be set in units of divided measurement areas, thereby minimizing an error over the entire area.

Figure 9:
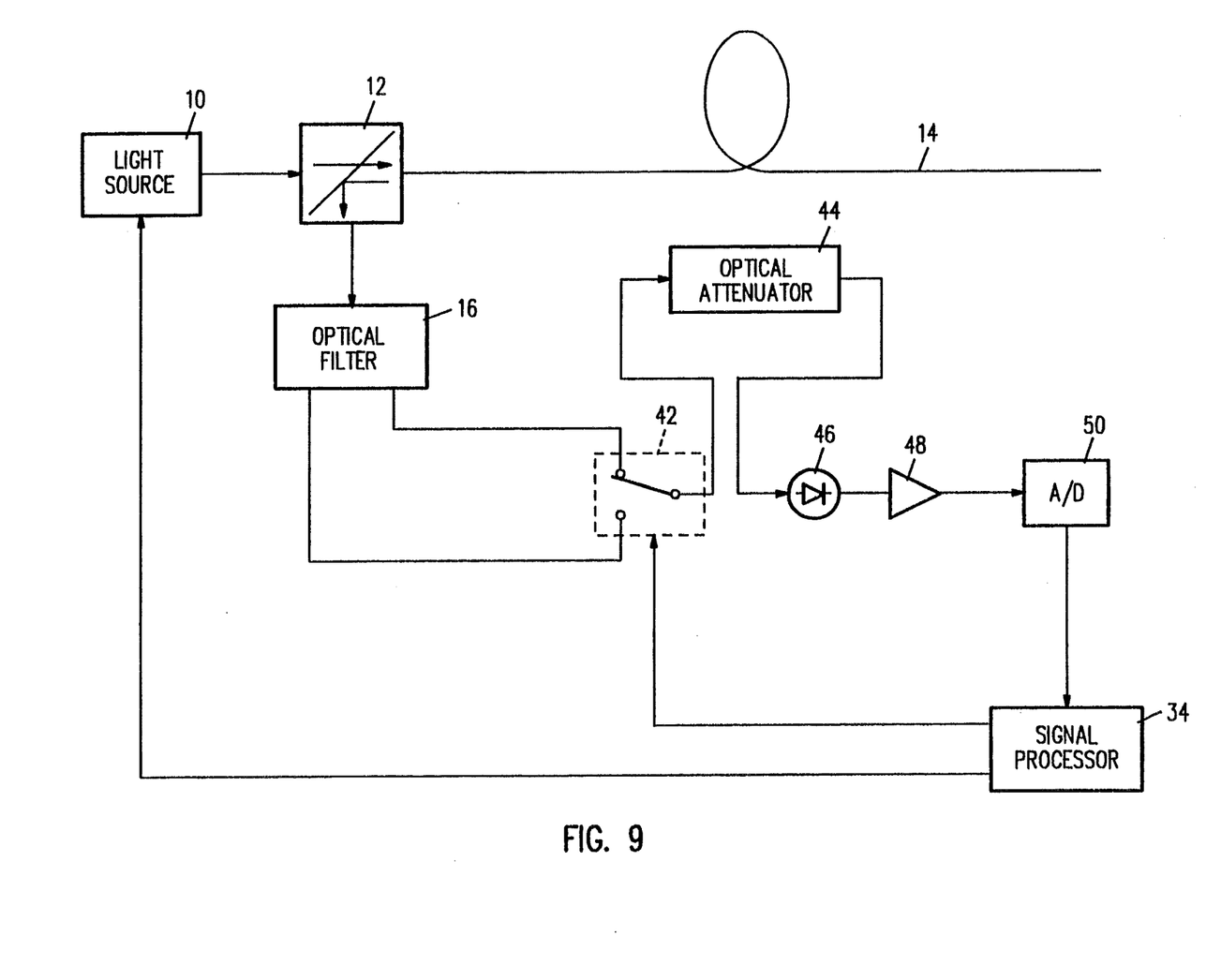
FIG. 9 is a block diagram of a modification of the first embodiment of the present invention.

If the attenuation factor is variable, the connection position of the optical attenuator 44 is not limited to a position between the optical filter 16 and the optical switch 42, but may be in a position between the directional coupler 12 and the optical filter 16 or between the optical switch 42 and the light-receiving element 46, as shown in FIG. 9. In this case, the attenuation factor of the optical attenuator 44 is switched to a value suitable for anti-Stokes' light or Stokes' light in synchronism with the switching between anti-Stokes' light and Stokes' light by the optical switch 42, thus obtaining the same effect as above.

Further, it is also possible to attenuate the intensity of the electrical signal instead of attenuating the intensity of received light. The signal attenuation is realized by connecting an electrical attenuator to the output of the light-receiving element 46 and the attenuation factor of the electrical attenuator is increased when Stokes' light is incident to the light-receiving element 46.

As described above, the temperature distribution measuring apparatus of this embodiment comprises the optical switch 42 for performing switching of an optical path so that the electrical signal representing the intensity of anti-Stokes' light and Stokes' light extracted by the optical filter 16 is A/D-converted by the single A/D converter 50, and the anti-Stokes' light and Stokes' light are sampled using the same light-receiving element 46, amplifier 48, and A/D converter 50. The temperature distribution measuring apparatus of this embodiment further comprises the optical attenuator 44 for adjusting the intensity of Stokes' light so that anti-Stokes' light and Stokes' light have substantially the same values. Therefore, noise components synchronous with measurement operations, such as may be caused by clocks, can be removed when the temperature distribution is measured, and the temperature resolution can be remarkably improved as compared to the prior art.

Other embodiments of the present invention will be described below. The same reference numerals in the other embodiments denote the same parts as in the first embodiment, and a detailed description thereof will be omitted.

Figure 3:
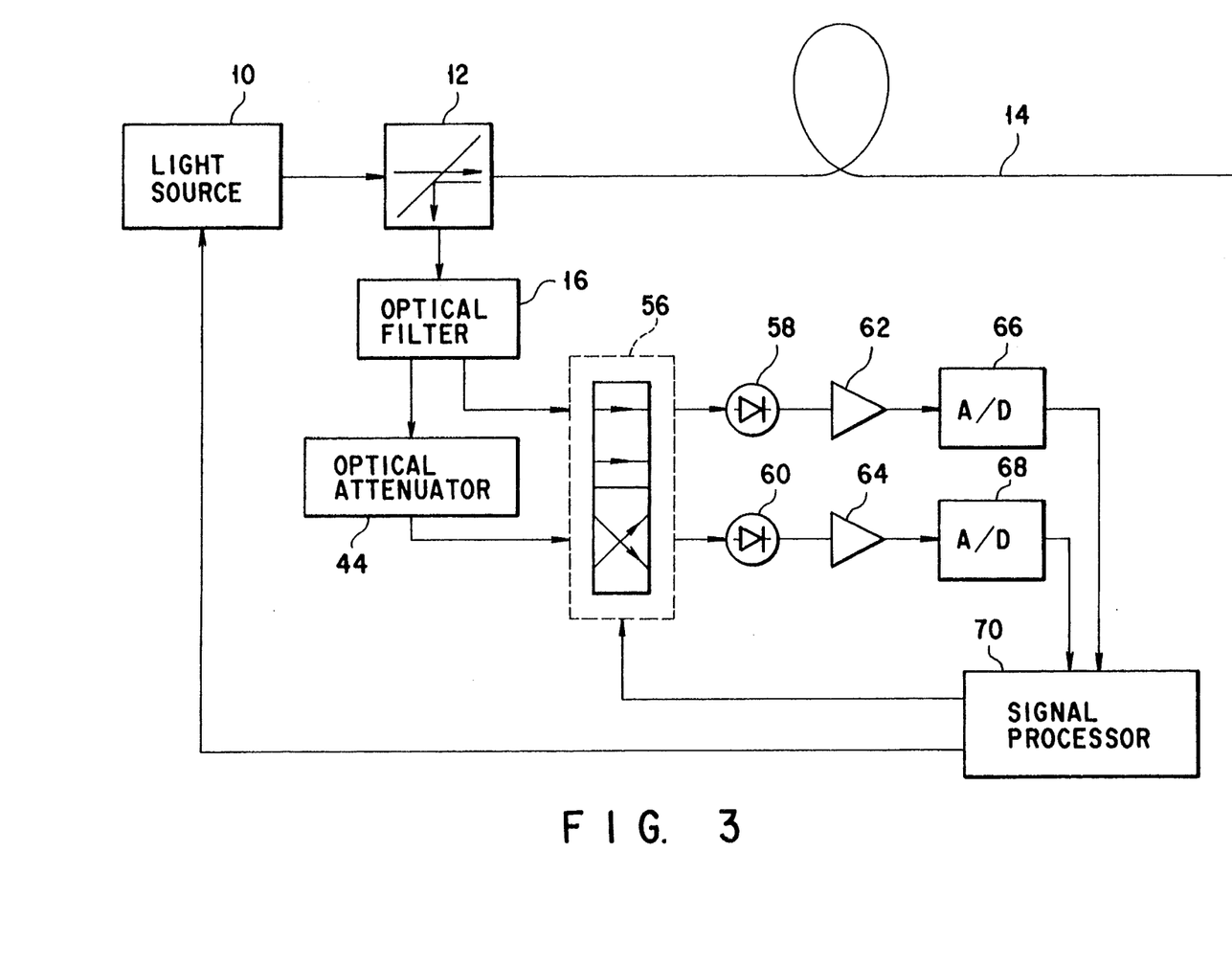
FIG. 3 is a block diagram showing a temperature distribution measuring apparatus according to the second embodiment of the present invention.

FIG. 3 is a block diagram showing the overall arrangement of a temperature distribution measuring apparatus according to the second embodiment of the present invention. The temperature distribution measuring apparatus of the second embodiment comprises a two-input/two-output optical switch 56 as an optical switching means which can switch anti-Stokes' light and Stokes' light to be input to either one of light-receiving elements and 60, respectively. Anti-Stokes' light from the optical filter 16 is input to the first input terminal of the switch 56 and Stokes' light from the optical attenuator 44 is input to the second input terminal of the switch 56. The switch 56 transmits the first and second input lights to the first and second output terminals or to the second and first output terminals. An electrical signal representing the intensity of the first output light is supplied to the amplifier 62 and to the first A/D converter 66, responsive to the receipt of the first output light by the light-receiving element 58. An electrical signal representing the intensity of the second output light is supplied to the second A/D converter 68 responsive to receipt of the second output light by the light-receiving element 60. The output signals of the A/D converters 66 and 68 are supplied to the signal processor 70.

The operation of the temperature distribution measuring apparatus of the second embodiment will be described below. In the first embodiment, when one of anti-Stokes' flight and Stokes' light is sampled, the other light cannot be sampled, but two sampling operations are required to obtain the ratio.

In contrast to the first embodiment, in the second embodiment, one light can be sampled by the light-receiving element 58, and the electrical signal generated in response thereto processed by the amplifier 62, and the A/D converter 66 and, at the same time, the other light can be sampled by the light-receiving element 60, and the electrical signal generated in response thereto processed by the amplifier 64 and the A/D converter 68. Additionally, the lights to be input to the light-receiving elements 58 and 60 can be exchanged by the optical switch 56.

First, the optical switch 56 is switched so that anti-Stokes' light is sampled by one system of the light-receiving element 58, and the electrical signal generated in response thereto processed by the amplifier 62, and the A/D converter 66, and Stokes' light is sampled by the other system of the light-receiving element 60, and the electrical signal generated in response thereto processed by the amplifier 64 and the A/D converter 68. In order to remove random noise, pulsed-light is radiated a large number of times, and amplified electrical signals representative of the intensities of anti-Stokes' light and Stokes' light output from the A/D converters 66 and 68 are subjected to averaging processing by the signal processor 70.

Then, the optical switch 56 is switched so that Stokes' light is sampled by one system of the light-receiving element 58, the amplifier 62, and the A/D converter 66, and anti-Stokes' light is sampled by the other system of the light-receiving element 60, the amplifier 64, and the A/D converter 68. At this time as well, amplified signals are subjected to averaging processing in units of Stokes' light intensity and anti-Stokes' light intensity. It is to be noted that the output signal from the A/D converter 66 is switched from the anti-Stokes' light path to Stokes' light path and the output signal from the A/D converter 68 is switched from Stokes' light path to anti-Stokes' light path. Therefore, it is necessary to switch the output signals from the A/D converters 66 and 68 when Stokes' light signal and anti-Stokes' light signals are averaged. Thereafter, the ratio between the intensities of the two light signals is calculated.

A case will be examined below wherein a signal includes many random noise components. More specifically, statistically, the number of random noise components is decreased in proportion to $\sqrt{n}$ (where n is the number of measurements). In this embodiment, when the number of measurements is the same as that in the first embodiment, since anti-Stokes' light and Stokes' light are simultaneously measured, the number of random noise components becomes $1/\sqrt{2}$ of that in the first embodiment. More specifically, this embodiment can decrease random noise to $1/\sqrt{2}$ more than the first embodiment if the number of times of measurements is the same as that in the first embodiment. When measurements are performed to achieve the same precision as that in the first embodiment, the number of times of measurements (the number of emissions of the pulsed-light) can be decreased to ½.

The signal processor 70 requires a longer calculation time than in the first embodiment since it must execute twice as many calculations as in the first embodiment for each measurement. For this reason, when measurements are performed to achieve the same precision as that in the first embodiment, the measurement time becomes undesirably longer than the time required in the first embodiment, although the quantity of measurements is decreased to ½. In this case, measurements can be performed within a time half that required in the first embodiment by arranging signal processors 70 in parallel. This can be realized by using, e.g., two signal processors 34 used in the first embodiment.

As described above, the temperature distribution measuring apparatus of the second embodiment comprises the optical switch 56 for exchanging anti-Stokes' light and Stokes' light to cause electrical signals representing the intensities to be input to the A/D converters 66 and 68 so that the two outputs from the optical switch 56 are simultaneously sampled by different systems of the light-receiving elements 58 and 60, the amplifiers 62 and 64, and the A/D converters 66 and 68. Therefore, noise components caused by signals synchronous with measurement processes, such as clocks, can be removed and random noise can be further reduced. For this reason, the resolution of temperature distribution measurement can be more remarkably improved than the first embodiment.

Further, according to the second embodiment, there is provided the optical switch 56 for exchanging anti-Stokes' light and Stokes' light the electrical signals generated responsive thereto by the light-receiving elements being input to the A/D converters 66 and 68. While it is possible to compensate for noises and measure an accurate temperature distribution, the amplifiers 62 and 64 and the A/D converters 66 and 68 include respective offset errors and gain errors. Therefore, the digital signals ADa and ADs representing the intensities of the anti-Stokes' light and the Stokes' light are actually represented by:

$$ADa = Fa \times Sa + Voff_a$$

$$ADs = Fs \times Ss + Voff_s$$

where

Fa: the span of the amplifier and the A/D converter which process the anti-Stokes' light Fs: the span of the amplifier and the A/D converter which process the Stokes' light $voff_a$: the offset of the amplifier and the A/D converter which process the anti-Stokes' light $voff_s$: the offset of the amplifier and the A/D converter which process the Stokes' light The offset Voff can be regarded as the periodic noise to be compensated for in the present invention. Therefore, it is necessary to make an offset included in the signal ADa and an offset included in the signal ADs equal. According to the second embodiment, the optical switch 96 exchanges the path of the amplifier 62 and the A/D converter 66 with the path of the amplifier 64 and the A/D converters 68 so that the anti-Stokes' light intensity signal and the Stokes' light intensity signal are averaged as follows:

$$\overline{ADa} = (Fa+Fs)/2 \times Sa + (Voff_a + Voff_s)/2$$

$$\overline{ADs} = (Fa+Fs)/2 \times Ss + (Voff_a + Voff_s)/2$$

Therefore, the offset and the span included in the signal ADa are equal to those included in the signal ADs. As a result, the noise compensation facility is further improved according to the second embodiment.

The third embodiment of the present invention will be described below.

Figure 4:
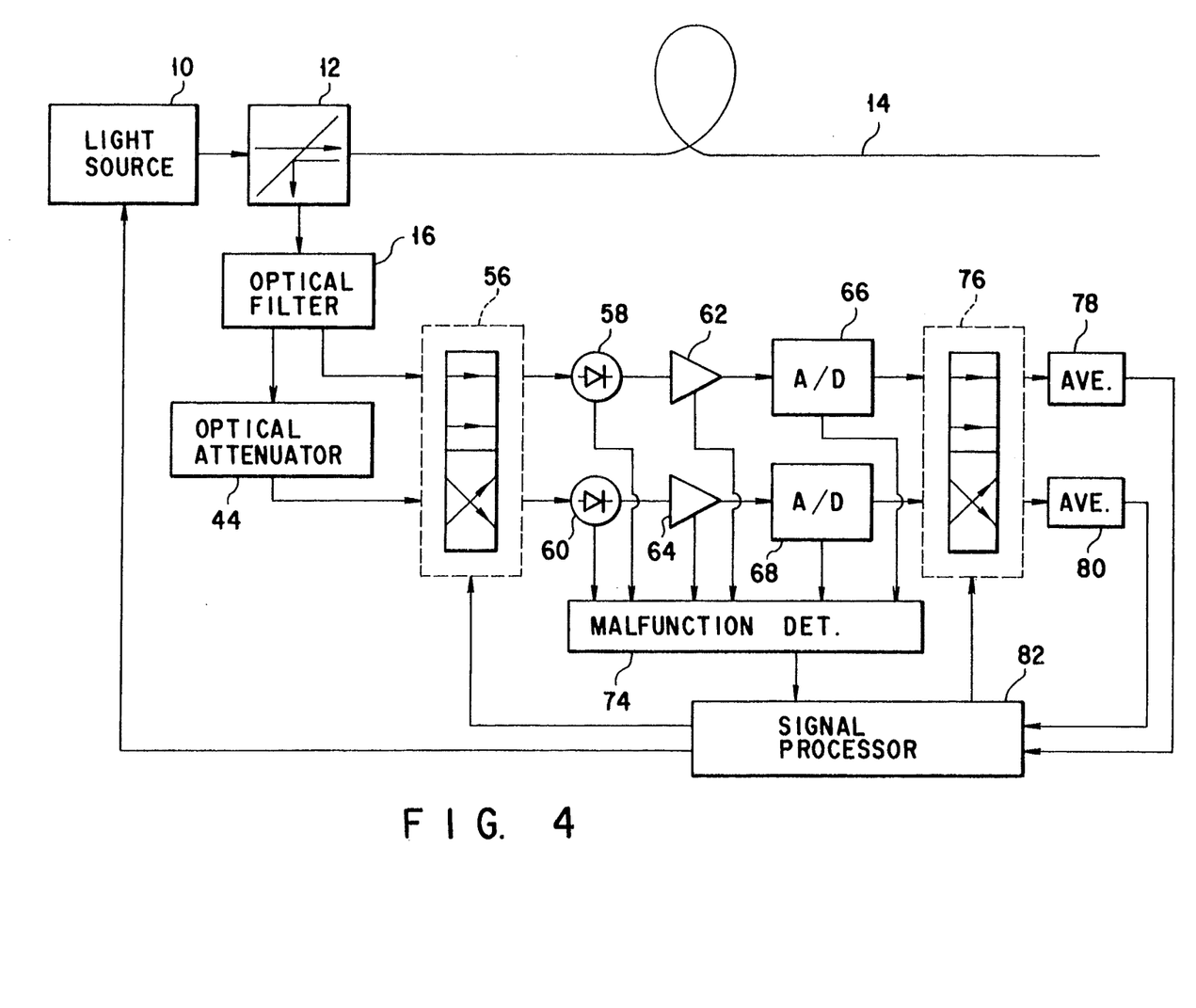
FIG. 4 is a block diagram showing a temperature distribution measuring apparatus according to the third embodiment of the present invention.

FIG. 4 is a block diagram showing the overall arrangement of a temperature distribution measuring apparatus according to the third embodiment of the present invention. The temperature distribution measuring apparatus of this embodiment measures the intensities of anti-Stokes' light and Stokes' light extracted by the optical filter 16 using two A/D converters 66 and 68, and comprises the two-input/two-output optical switch 56 as an optical switching means for performing switching of optical path so as to switch anti-Stokes' light and Stokes' light to be presented to the light-receiving elements 58 and 60, and thus input to the A/D converters 66 and 68, and a malfunction detector 74 for detecting malfunctions of operations of the light-receiving elements 58 and 60, amplifiers 62 and 64, and A/D converters 66 and 68. The outputs from the A/D converters 66 and 68 are respectively supplied to digital averaging units 78 and 80 via a two-input/two-output electrical switch 76. The outputs from the digital averaging units 78 and 80 are supplied to a signal processor 82. The signal processor 82 calculates temperature data on the basis of one or both of the outputs from the digital averaging units 78 and 80 in accordance with the detection result from the malfunction detector 74.

The operation of the third embodiment will be described below.

In this embodiment, two systems of A/D converters 66 and 68 are provided, and the apparatus of this embodiment operates in the same manner as in the second embodiment in a normal state. More specifically, the optical switch 56 is switched so that anti-Stokes' light is sampled and processed by one system of the light-receiving element 58, the amplifier 62, and the A/D converter 66, and Stokes' light is sampled and processed by the other system of the light-receiving element 60, the amplifier 64, and the A/D converter 68. The electrical switch 76 and the optical switch 56 are switched so that anti-Stokes' light signal is input to the digital averaging unit 78 and the Stokes' light signal is input to the digital averaging unit 80. In order to remove random noise, pulsed-light is radiated a large number of times, and anti-Stokes' light signals and Stokes' light signals output from the A/D converters 66 and 68 are subjected to averaging processing by the digital averaging units 78 and 80.

Then, the optical switch 56 is switched so that Stokes' light is sampled by one system of the light-receiving element 58, the amplifier 62, and the A/D converter 66, and anti-Stokes' light is sampled by the other system of the light-receiving element 60, the amplifier 64, and the A/D converter 68. The electrical switch 76 and the optical switch 56 are switched so that anti-Stokes' light signal is input to the digital averaging unit 78 and the Stokes' light signal is input to the digital averaging unit 80. In order to remove random noise, pulsed-light is radiated a large number of times, and anti-Stokes' light signals and Stokes' light signals output from the A/D converters 66 and 68 are subjected to averaging processing by the digital averaging units 78 and 80. Thereafter, the ratio between the two light signals output from the digital averaging units 78 and 80 is calculated.

The third embodiment includes the malfunction detector 74 to detect whether or not each portion of the apparatus is operating normally. If the malfunction detector 74 detects a malfunction in a certain portion of the apparatus, the third embodiment operates in the same manner as in the first embodiment. The malfunction detector 74 detects malfunctions of the light-receiving elements 58 and 60, the amplifiers 62 and 64, and the A/D converters 66 and 68. Note that malfunctions of the digital averaging units 78 and 80 are detected by the signal processor 82. Since the light-receiving elements 58 and 60 normally comprise avalanche diodes, their malfunctions are detected by monitoring, e.g., reverse bias voltages (i.e., control voltages thereof). The malfunctions of the amplifiers 62 and 64 are detected by monitoring output voltages obtained when no pulsed-light is emitted so as to detect, e.g., abnormal drifts. Furthermore, the malfunctions of the A/D converters 66 and 68 are detected by monitoring a reference power supply. The malfunctions of the digital averaging units 78 and 80 are detected from calculation results of data output therefrom such as a measured result of the rate of change of averaged data to the previous measured value, a comparison result of change values of individual data strings, or the like.

When the malfunction detector 74 detects a malfunction in one A/D conversion system on the basis of the above-mentioned diagnosis results, the signal processor 82 alternately measures anti-Stokes' light and Stokes' light using a normal system alone, and causes the digital averaging units 78 and 80 to execute averaging processing of signals representing the intensities of these light components by properly controlling the electrical switch 76. Thus, the same operation as in the first embodiment can be achieved. Of course, when a malfunction is detected, the malfunction detection result is externally output by certain means.

When one of the digital averaging units 78 and 80 malfunctions, anti-Stokes' light and Stokes' light are sequentially averaged using a normal unit 78 or 80, and the averaged values are sequentially supplied to the signal processor 82.

As described above, the temperature distribution measuring apparatus of the third embodiment simultaneously measures anti-Stokes' light and Stokes' light extracted by the optical filter 16 using the two A/D converters 66 and 68, and comprises the optical switch 56 for switching signals representing the intensities of anti-Stokes' light and Stokes' light to be input to the A/D converters 66 and 68 with each other. The two outputs from the optical switch 56 are simultaneously sampled by different systems formed of the light-receiving elements 58 and 60, the amplifiers 62 and 64, and the A/D converters 66 and 68 as in the second embodiment. Therefore, since noise components synchronous with measuring processes, such as may be caused by clocks, can be removed, and random noises can be further reduced, the temperature resolution can be more remarkably improved than the first embodiment. Furthermore, since temperature data is output using one or both of measurement results obtained by the A/D converters 66 and 68 and their processing sections on the basis of the diagnostic result of the malfunction detector 74 for diagnosing whether or not a circuit portion is normal, even when one signal processing system malfunctions, measurements can be continued without interruption.

In each of the second and third embodiments, the optical switch 56 is used as the switching means. However, the present invention is not limited to this embodiment. For example, an electrical switch may be used as the switching means. In this case, the same arrangement as in the prior art may be used up to the light-receiving elements 58 and 60, and the electrical switch may be arranged between the light-receiving elements 58 and 60 and the A/D converters 66 and 68 or between the amplifiers 62 and 64 and the A/D converters 66 and 68. Thus, synchronous noise generated in the A/D converters 66 and 68 can be removed by the same principle as in the second and third embodiments. Also, this modified arrangement can be achieved with an optical system that is simpler than those in the second and third embodiments.

Figure 5:
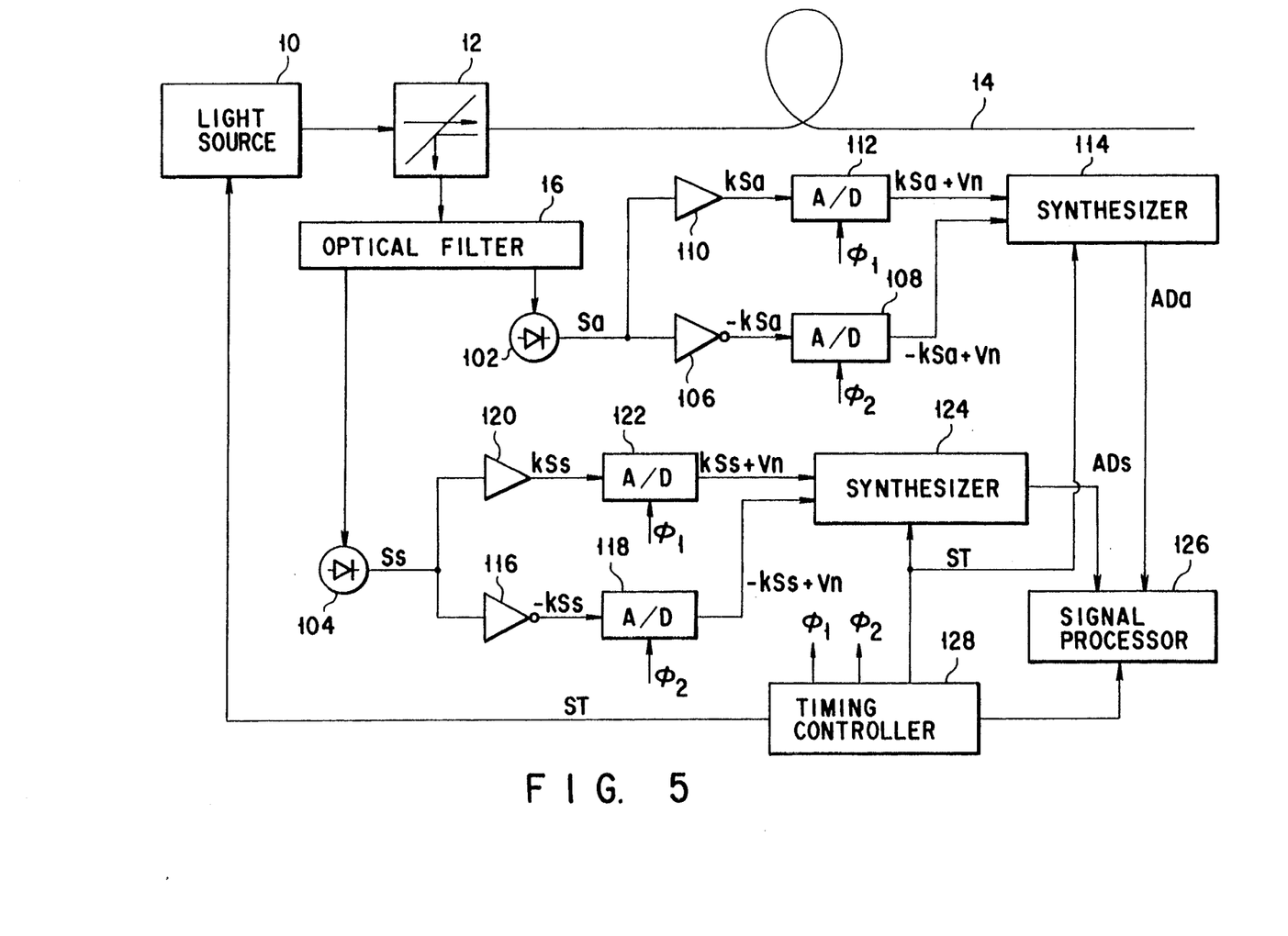
FIG. 5 is a block diagram showing a temperature distribution measuring apparatus according to the fourth embodiment of the present invention.

FIG. 5 is a block diagram of the fourth embodiment. In the fourth embodiment, anti-Stokes' light and Stokes' light obtained by the optical filter 16 are respectively supplied to light-receiving elements 102 and 104. The electrical signals output from the light-receiving element 102 is supplied to an A/D converter 108 via an inverting amplifier 106, and is also supplied to an A/D converter 112 via a non-inverting amplifier 110. The outputs from the A/D converters 108 and 112 are supplied to a signal synthesizer 114. The output from the light-receiving element 104 is supplied to an A/D converter 118 via an inverting amplifier 116, and is also supplied to an A/D converter 122 via a non-inverting amplifier 120. The outputs from the A/D converters 118 and 122 are supplied to a signal synthesizer 124. The outputs from the signal synthesizers 114 and 124 are supplied to a signal processor 126, to thus obtain temperature data (the ratio of the anti-Stokes' intensity of light to the intensity of Stokes' light). The A/D converters 112 and 122 are controlled by a clock signal $\phi_1$ from a timing controller 128, and the A/D converters 108 and 118 are controlled by a clock signal $\phi_2$ from the timing controller 128. The phases of the clock signals $\phi_1$ and $\phi_2$ are shifted from each other by 180°. The timing controller 128 also controls the light emission timing of the light source 10, and controls the operation timings of the signal synthesizers 114 and 124, and the signal processor 126.

The operation of the fourth embodiment will be described below.

Figure 6A:
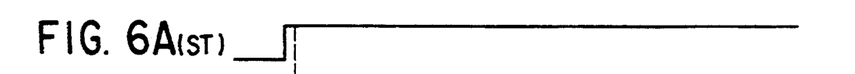
FIGS. 6A to 6E are timing charts showing an operation in odd-numbered measurements in the fourth embodiment.

When the timing controller 128 generates a start signal ST shown in FIG. 6A, the light source 10 emits pulsed-light. The pulsed-light input to the probe 14 propagates through the optical fiber 14 while being attenuated, and backward Raman-scattered light components proportional to degrees of attenuation and corresponding to the ambient temperature are generated at respective points in the optical fiber 14. Of the backward Raman-scattered light components, anti-Stokes' light is detected by the light-receiving element 102 via the optical filter 16, and is converted into a weak analog electrical signal Sa.

The analog electrical signal Sa is branched into two signal paths. The signal supplied to one signal path is amplified by the non-inverting amplifier 110 having a gain of k to be converted into an analog electrical signal kSa, and the signal supplied to the other signal path is amplified by the inverting amplifier 106 having a gain of $-k$ to be converted into an analog electrical signal $-kSa$.

Figure 6B:
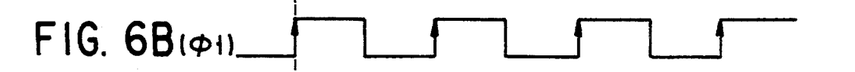
Figure 6C:
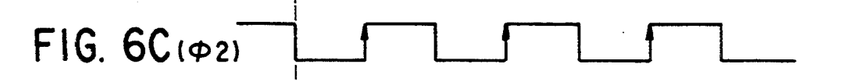
Figure 6D:
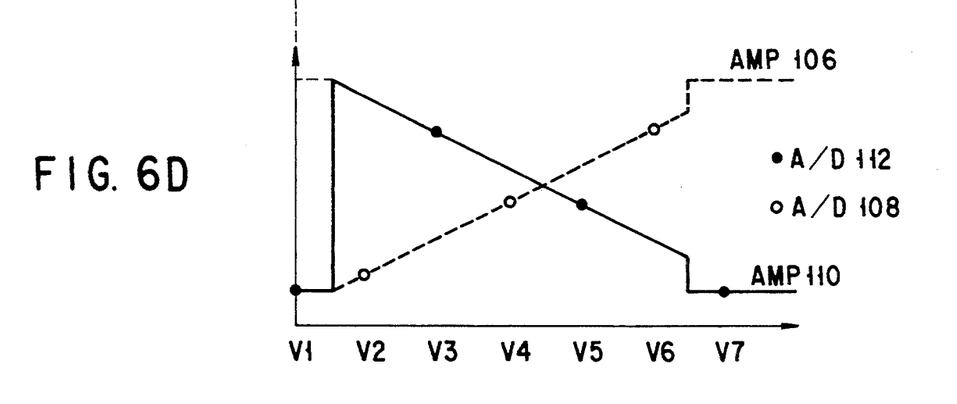

The timing controller 128 generates the clock signal $\phi_1$ shown in FIG. 6B and the clock signal $\phi_2$ shown in FIG. 6C after it generates the start signal ST (FIG. 6A). The clock signal $\phi_1$ is supplied to the A/D converters 112 and 122, and the clock signal $\phi_2$ is supplied to the A/D converters 108 and 122. Thus, the A/D converter 112 samples the analog electrical signal kSa in response to the leading edge of the clock signal $\phi_1$, as indicated by a solid line in FIG. 6D, and the A/D converter 108 samples the analog electrical signal $-kSa$ in response to the leading edge of the clock signal $\phi_2$, as indicated by a broken line in FIG. 6D. After the first pulse of the clock $\phi_1$ is generated, the first scattered light is returned. After the third pulse of the clock $\phi_1$ is generated, the last scattered light is returned.

Digital electrical signals $V_1$ to $V_7$ sequentially obtained by these sampling operations (the number of times of sampling operations is seven, in this case) are sequentially stored in the signal synthesizer 114 in synchronism with the start signal. ST output from the timing controller 128.

The digital electrical signals $V_1$ to $V_7$ additionally include periodic noise components $V_n$ caused by the sampling clocks of the A/D converters, as described above. In this case, as for the digital electrical signal $-kSa$ obtained from the A/D converter 108, since the analog signal Sa is multiplied with $-k$ by the inverting amplifier 106, noise components are added after they are multiplied with $-1$, i.e., they are subtracted.

Therefore, the signals $V_2$, $V_4$, and $V_6$ sampled by the A/D converter 108 are multiplied with $-1$, and thereafter, are input to the signal synthesizer 114 as $-(-kSa+V_n)$, while the signals $V_1$, $V_3$, $V_5$, and $V_7$ sampled by the A/D converter 112 are directly input to the signal synthesizer 114 as $kSa+V_n$. The signal synthesizer 114 adds these signals $V_1$ to $V_7$ to connect them, as shown in FIG. 6E, thus ending a single sampling operation of the anti-Stokes' light.

Similarly, as for the stokes' light, inverting- and non-inverting-amplified signals are alternately sampled by the A/D converters 118 and 122 in accordance with the clock signals $\phi_1$ and $\phi_2$ which have 180° phase difference therebetween.

Figure 7A:
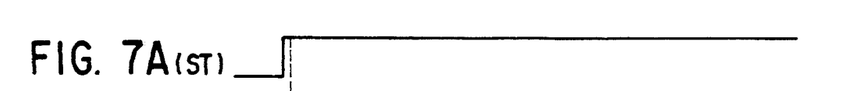
FIGS. 7A to 7E are timing charts showing an operation in even-numbered measurements in the fourth embodiment.
Figure 7B:
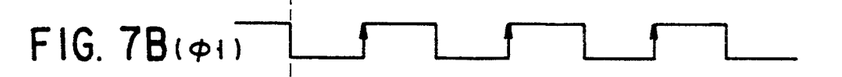
Figure 7C:
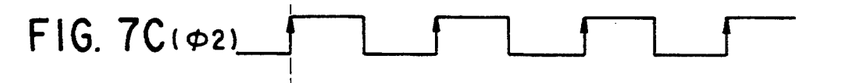
Figure 7D:
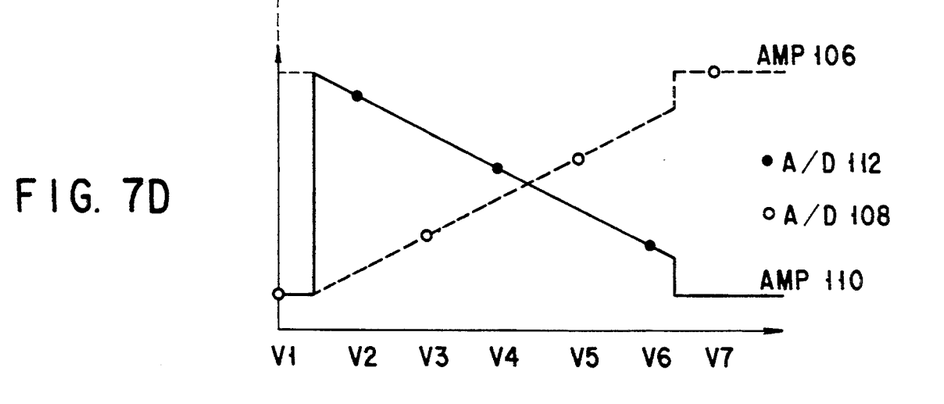

After the measurement of anti-Stokes' light and Stokes' light for the first time, the phases of the clocks $\phi_1$ and $\phi_2$ are inverted. That is, for the measurement for the second time, as shown in FIGS. 7B and 7C, the timing controller 128 generates the clock signals $\phi_1$ and $\phi_2$ inverted from those shown in FIGS. 6B and 6C. For this reason, as shown in FIG. 7D, the A/D converters 108 and 112 operate at timings opposite to those shown in FIG. 6D. More specifically, the A/D converter 108 samples the signals $V_1$, $V_3$, $V_5$, and $V_7$, and the A/D converter 112 samples the signals $V_2$, $V_4$, and $V_6$. Each of the signals $V_2$, $V_4$, and $V_6$ sampled by the A/D converter 112 assumes a value $kSa+Vn$, and each of the signals $V_1$, $V_3$, $V_5$, and $V_7$ sampled by the A/D converter 108 assumes a value $-(-kSa+Vn)$.

Figure 6E:
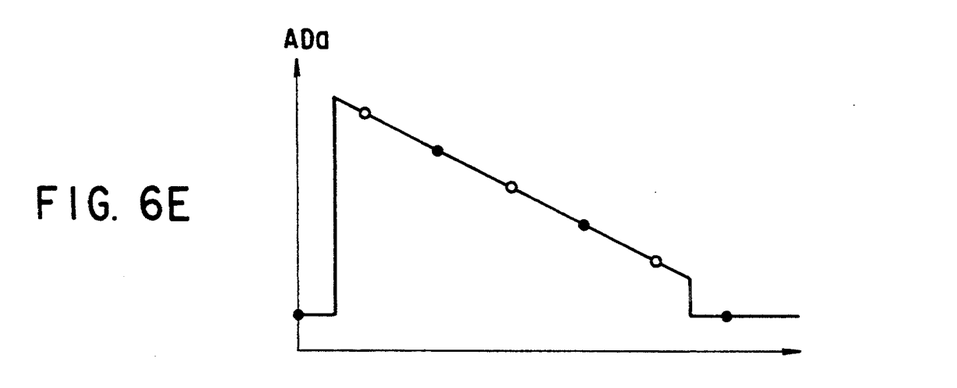
Figure 7E:
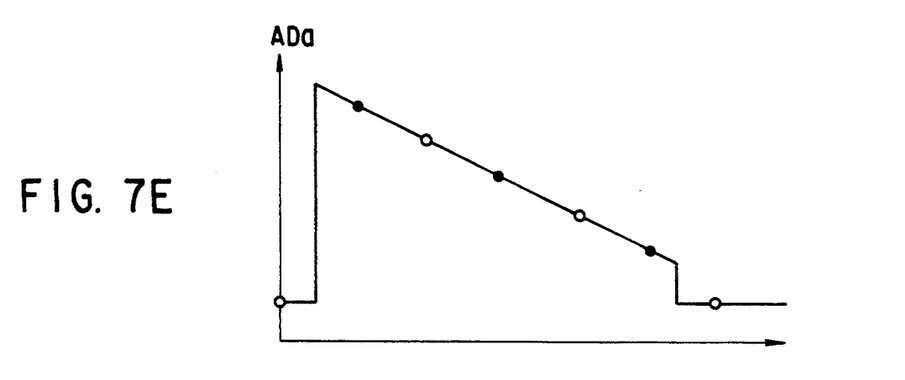

The signal synthesizer 114 adds and averages the signals shown in FIGS. 6E and 7E. Thus, the periodic noise components Vn are removed from a processed signal ADa of any of the values $V_1$ to $V_7$ as follows:

$$ADa = [(kSa + Vn) + \{-(-kSa + Vn)\}]/2 \quad (2)$$
$$= kSa$$

Such a series of measurements (two measurements with inverting the phases of the clocks $\phi_1$ and $\phi_2$) are continuously executed m times, and the signal processor 126 averages equation (2) m times. The average is obtained by m/2 items of data sampled by the A/D converter 112 and m/2 items of data sampled by the A/D converter 108 for each of $V_1$ to $V_7$. Therefore, for example, if an error $\epsilon_{off}$ due to offsets of the two A/D converters 112 and 108 is present, and if an offset caused by the A/D converter 112 is represented by $Voff_a$ and an offset caused by the A/D converter 108 is represented by $Voff_b$, an error is given by the following equation by the addition/averaging processing:

$$\epsilon_{off} = (Voff_a + Voff_b)/2 \quad (3)$$

Since the A/D converters 112 and 108 alternately operate, it is easy to compensate for the offset if the offsets of the A/D converters 112 and 108 are substantially equal to each other. For this reason, even when an error caused by the offsets of the two A/D converters 112 and 108 is present, it does not influence the temperature distribution detection result. Also, an error caused by spans does not influence the temperature distribution detection result for the same reason as described above.

To summarize the above-mentioned facts, a digital electrical signal AD including these errors can be expressed by:

$$AD_{+k} = Fa \times kS + Voff_a + Vn \quad (4)$$

$$AD_{-k} = -Fb \times kS + Voff_b + Vn \quad (5)$$

where
$AD_{+k}$: the digital electrical signal output from the A/D converter 112 or 122
$AD_{-k}$: the digital electrical signal output from the A/D converter 108 or 118
Fa: the span of the A/D converter 112 or 122
Fb: the span of the A/D converter 108 or 118

Equation (5) is subtracted from equation (4), and the difference is divided by 2 to obtain an average as follows:

$$(AD_{+k} - AD_{-k})/2 = \{(Fa+Fb)/2\} \times kS + (Voff_a + Voff_b)/2 \quad (6)$$

Therefore, as described above, since Vn can be removed, and errors caused by the offsets and spans can be averaged and do not influence the temperature distribution detection result, the temperature distribution can be detected with high precision.

As described above, the temperature distribution measuring apparatus of the fourth embodiment branches the analog electrical signals S output from the light-receiving elements 102 and 104 into two paths each so that the analog electrical signals supplied to one path are non-inverting-amplified, and converted into digital signals $kS+Vn$ by the A/D converters 112 and 122; the analog electrical signals supplied to the other path are inverting-amplified, and are converted into digital signals $-kS+Vn$ by the A/D converters 108 and 118. Furthermore, the signal synthesizers 114 and 124 subtract the inverting-amplified digital signals $-kS+Vn$ from the non-inverting-amplified digital signals $kS+Vn$, and divide the differences by 2, thereby removing the periodic noise components Vn due to the A/D converters 112, 108, 122, and 118. Therefore, since the digital signals kSa (anti-Stokes' light) and kSs (Stokes' light), free from the periodic noise components Vn, are obtained as detection signals of backward Raman-scattered light reflecting the ambient temperature of the probe 14, the detection precision of the temperature distribution can be improved.

Since the timing controller 128 reverses the sampling orders of the two A/D converters 112 and 108; 122 and 118 for every temperature distribution detection, errors caused by the offsets and spans of the two A/D converters 112 and 108; 122 and 118 can be averaged. This also leads to prevention of a fluctuation generated at a period twice a sampling period based on errors between two A/D conversion systems when two time-series data obtained by alternately driving the two A/D conversion systems are combined to form single time-series data.

In the fourth embodiment, the addition/averaging processing is performed for every measurement, and signals are stored. However, the present invention is not limited to this embodiment. For example, the outputs from the A/D converters 112 and 108 may be separately added and averaged a required number of times, the addition/averaging result of the A/D converter 112 may be subtracted from the addition/averaging result of the A/D converter 108, and the difference may be divided by 2, thus achieving the same effect as described above.

In the above description, the signal is divided by 2 as represented by equation (2). However, the present invention is not limited to this embodiment. Even when the signal is not divided by 2, the periodic noise components vn can be similarly removed.

Furthermore, in the above description, the digital electrical signal from the A/D converter 108 is multiplied by $-1$, and is then added to the digital signal from the A/D converter 112 so as to obtain a difference between the two digital electrical signals. However, the present invention is not limited to this embodiment. For example, when the digital electrical signal from the A/D converter 108 is directly subtracted from the digital electrical signal from the A/D converter 112, the present invention can be similarly practiced.

Figure 8:
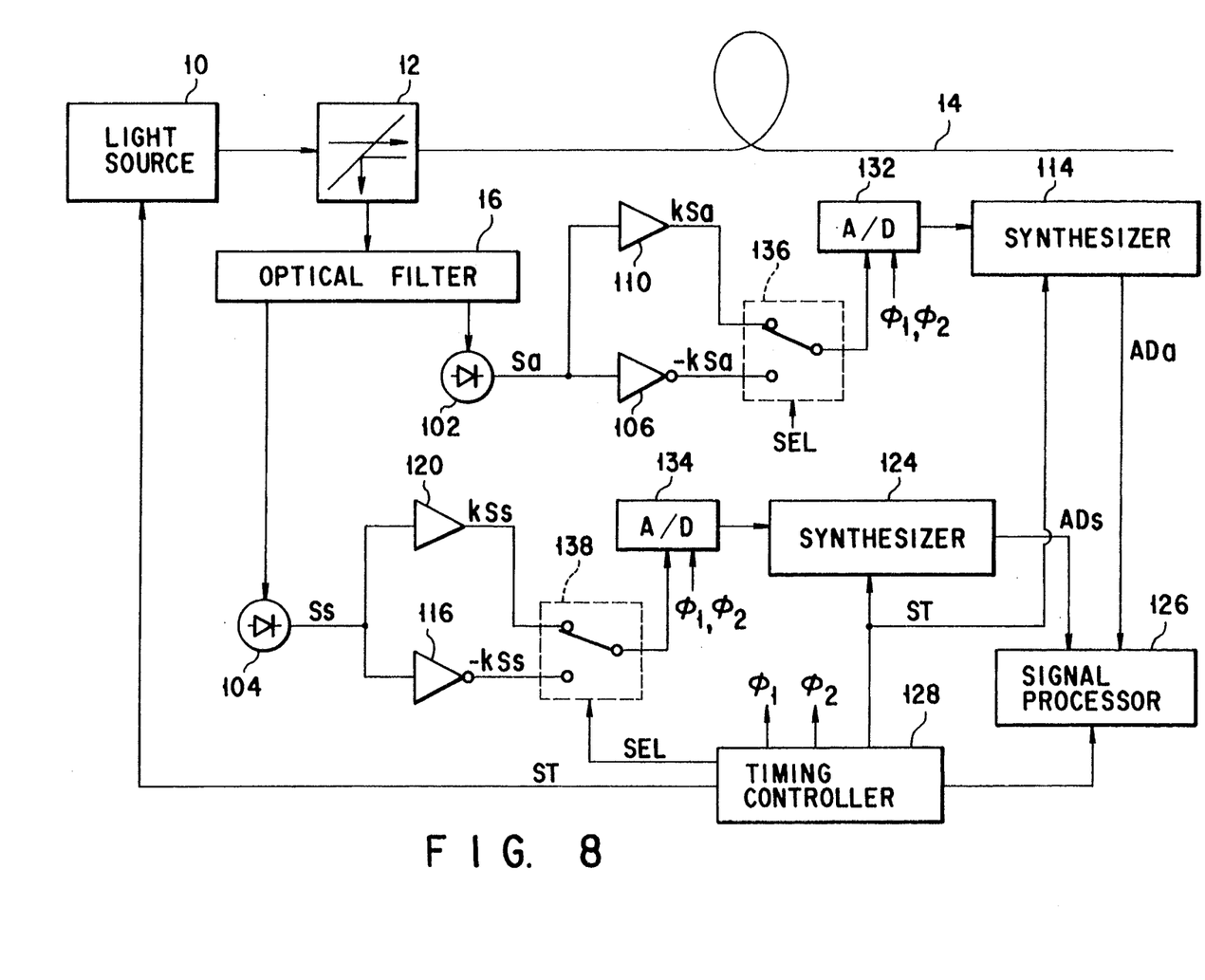
FIG. 8 is a block diagram showing a temperature distribution measuring apparatus according to the fifth embodiment of the present invention.

FIG. 8 is a block diagram of the fifth embodiment. Differences of the fifth embodiment from the fourth embodiment are as follows. A pair of A/D converters 132 and 134 are arranged in place of two pairs of A/D converters 112 and 108; 122 and 118 for respectively sampling inverting-amplified signals and non-inverting-amplified signals, and selection switches 136 and 138 are added to the analog signal input terminals of these A/D converters 132 and 134. The switching operations of the selection switches 136 and 138 are controlled by the timing controller 128 so that the non-inverting-amplified signal kS and inverting-amplified signal −kS are alternately input to the A/D converter 132 or 134. Other arrangements are the same as those in the fourth embodiment.

Thus, the A/D converter 132 or 134 converts the analog electrical signals alternately input from a non-inverting amplifier 110 or 120 and an inverting amplifier 106 or 116 into a digital electrical signal on the basis of a clock signal from the timing controller 128. The timing controller 128 supplies a start signal ST to signal synthesizers 114 and 124, and the digital electrical signals are sequentially stored, thus ending a series of measurements.

The series of measurements are performed m times as in the fourth embodiment, and the signals are added and averaged by the signal synthesizers 114 and 124, thus reproducing a series of time-serial signals.

As described above, in the fifth embodiment, since the analog electrical signals are converted into the digital electrical signals using the single A/D converter 132 or 134, the number of A/D converters can be decreased, and errors caused by offsets and spans can also be eliminated.

Since the periodic noise components Vn additionally included in the converted digital electrical signals perfectly coincide with each other between inverting and non-inverting signals, the removal ratio of the periodic noise components Vn can be further improved.

As described above, according to the present invention, a temperature distribution measuring apparatus comprises switching means for performing switching so that anti-Stokes' light and Stokes' light extracted by an optical filter are A/D converted by a single A/D conversion means, and attenuation means for attenuating the intensity of the anti-Stokes' light so that anti-Stokes' light and Stokes' light have nearly the same values. Therefore, it is possible to provide a highly reliable temperature distribution measuring apparatus, which can remove noise components synchronous with measuring processes such as clocks, and can remarkably improve the temperature resolution.

A temperature distribution measuring apparatus comprises switching means for performing switching so that anti-Stokes' light and Stokes' light extracted by the optical filter are simultaneously sampled by two A/D conversion means, and the anti-Stokes' light and Stokes' light to be input to the A/D conversion means are switched with each other. Therefore, it is possible to provide a highly reliable temperature distribution measuring apparatus, which can remove noise components synchronous with measuring processes such as clocks, can further remove random noise components, and can remarkably improve the temperature resolution.

A temperature distribution measuring apparatus comprises two measuring systems having the same functions and diagnosis means for detecting malfunctions in respective portions of the apparatus. The temperature distribution measuring apparatus outputs temperature data using normal measuring system or systems. Therefore, even when one measuring system malfunctions, measurements can be continued without interruption.

An analog electrical signal output from a photoelectric conversion element is branched into two paths, the analog electrical signal supplied to one path is non-inverting-amplified, the analog electrical signal supplied to the other path is inverting-amplified, and a difference between the non-inverting-amplified and inverting-amplified digital electrical signals is calculated. Therefore, a temperature distribution detection apparatus, which can improve detection precision of the temperature distribution by removing periodic noise components added upon conversion of analog electrical signals into digital electrical signals, can be provided.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents. For example, in the above description the ratios of anti-Stokes' light to Stokes' light sequentially sampled after the pulsed-light is emitted are plotted along the time axis to obtain the temperature distribution along the probe. However, it is not absolutely necessary to obtain the temperature distribution in the present invention. The present invention can be applied to a temperature sensor merely measuring a temperature at one point in the probe based on a single item of sampling data obtained at a timing corresponding to the point.

What is claimed is:

1. An apparatus for measuring a temperature distribution along an optical fiber, comprising:
   light source means for inputting pulsed-light into said optical fiber;
   optical filter means for receiving backward Raman-scattered light of the pulsed-light generated in said optical fiber, and extracting anti-Stokes' light and Stokes' light from the backward Raman-scattered light;
   attenuation means for attenuating the intensity of the Stokes' light extracted by said optical filter means;
   optical switching means for receiving the anti-Stokes' light extracted by said optical filter means and the intensity-attenuated Stokes' light output from said attenuation means, and selectively outputting one of the anti-Stokes' light extracted and the intensity-attenuated Stokes' light output;
   light-receiving means for detecting the light output from said optical switching means to output an analog signal representative of the intensity of said light output from said optical switching means;
   analog-to-digital conversion means for converting the analog signal output from said light-receiving means into a digital signal; and
   calculation means for calculating a temperature distribution along said optical fiber on the basis of the digital signal
   wherein said attenuation means attenuates the intensity of the Stokes' light so that the intensity of the intensity-attenuated Stokes' light and the intensity of the anti-Stokes' light are nearly equal.

2. An apparatus according to claim 1, wherein the digital signal indicates the intensity of the anti-Stokes' light and the intensity of the intensity-attenuated Stokes' light, and said calculation means calculates the temperature distribution on the basis of a ratio of the intensity of the anti-Stokes' light to the intensity of the intensity-attenuated Stokes' light indicated by the digital signal.

3. An apparatus according to claim 1, wherein said light source means inputs pulsed-light into said optical fiber a plurality of times, the digital signal indicates the intensities of anti-Stokes' light and the intensities of the intensity-attenuated Stokes' light, and said calculation means calculates the temperature distribution on the basis of a ratio of an average value of the intensities of the anti-Stokes' light to an average value of the intensities of the intensity-attenuated Stokes' light indicated by the digital signal.

4. An apparatus for measuring a temperature distribution along an optical fiber, comprising:
light source means for inputting pulsed-light into said optical fiber;
optical filter means for receiving backward Raman-scattered light of the pulsed-light generated in said optical fiber, and extracting anti-Stokes' light and Stokes' light from the backward Raman-scattered light;
optical switching means for receiving the anti-Stokes' light and the Stokes' light extracted by said optical filter means and selectively outputting one of the anti-Stokes' light and the Stokes' light;
attenuation means for attenuating the intensity of the Stokes' light when it is selectively output from said optical switching means;
light-receiving means for detecting the intensity-attenuated Stokes' light output from said attenuation means and the anti-Stokes' light output from said optical switching means to output an analog signal;
analog-to-digital conversion means for converting the analog signal output from said light-receiving means into a digital signal; and calculation means for calculating a temperature distribution along said optical fiber on the basis of the digital signal from said analog-to-digital conversion means
wherein said attenuation means attenuates the intensity of the Stokes' light so that the intensity of the intensity-attenuated Stokes' light and the intensity of the anti-Stokes' light are nearly equal.

5. An apparatus according to claim 4, wherein the digital signal indicates the intensity of the anti-Stokes' light and the intensity of the intensity-attenuated Stokes' light, and said calculation means calculates the temperature distribution on the basis of a ratio of the intensity of the anti-Stokes' light to the intensity of the intensity-attenuated Stokes' light indicated by the digital signal.

6. An apparatus according to claim 4, wherein said light source means inputs pulsed-light into said optical fiber a plurality of times, the digital signal indicates the intensities of anti-Stokes' light and the intensities of the intensity-attenuated Stokes' light, and said calculation means calculates the temperature distribution on the basis of a ratio of an average value of the intensities of the anti-Stokes' light to an average value of the intensities of the intensity-attenuated Stokes' light indicated by the digital signal.

* * * * *